United States Patent [19]

Johnson

[11] Patent Number: 5,095,177
[45] Date of Patent: Mar. 10, 1992

[54] RF SEALED RADIO HOUSING
[75] Inventor: Martin L. Johnson, Yately, England
[73] Assignee: Technophone Limited, Surrey, England
[21] Appl. No.: 585,882
[22] Filed: Sep. 20, 1990
[30] Foreign Application Priority Data
   Sep. 28, 1989 [GB] United Kingdom ............... 8921929
[51] Int. Cl.⁵ .............................................. H05K 9/00
[52] U.S. Cl. .............................. 174/35 R; 174/35 MS; 361/424
[58] Field of Search .......... 174/35 R, 35 GC, 35 MS; 361/424; 219/10.55 D, 10.55 R; 220/3.8, 4.02, 4.28, 623, 624, 608, 609, 669, 670, 681; 455/300, 301

[56] References Cited
U.S. PATENT DOCUMENTS
1,765,443  6/1930  Peterson ..................... 174/35 GC
2,627,359  2/1953  Woodward ........................ 220/3.5
4,816,612  3/1989  Yeom ........................... 174/35 R FOREIGN PATENT DOCUMENTS
0298797  12/1989  Japan .......................... 174/35 R
WO8301174  3/1983  World Int. Prop. O.

Primary Examiner—Leo P. Picard
Assistant Examiner—Bot Lee Ledynh
Attorney, Agent, or Firm—Perman & Green

[57] ABSTRACT

A two-piece transceiver housing for a mobile telephone comprises an open-topped box and a separate lid both made of conductive material, specifically diecast aluminium. A plurality of flat projections are formed integrally on the underside of the lid. These projections are arranged to bear internally against the side wall of the box when the lid is in place to prevent radio frequency radiation escaping from the housing without the need for a separate sealing component. The projections have a tapering curvilinear or rectilinear profile. This helps to distribute the stress and enables the projections to suffer slight deflection without breaking even when they are made of cast aluminium which is relatively brittle.

19 Claims, 1 Drawing Sheet

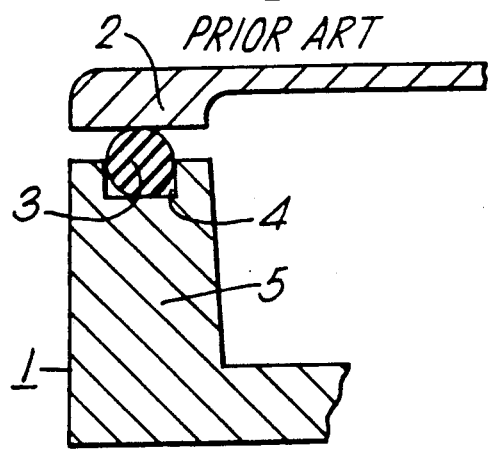
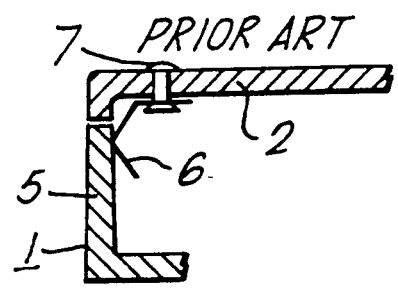
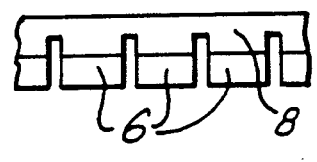
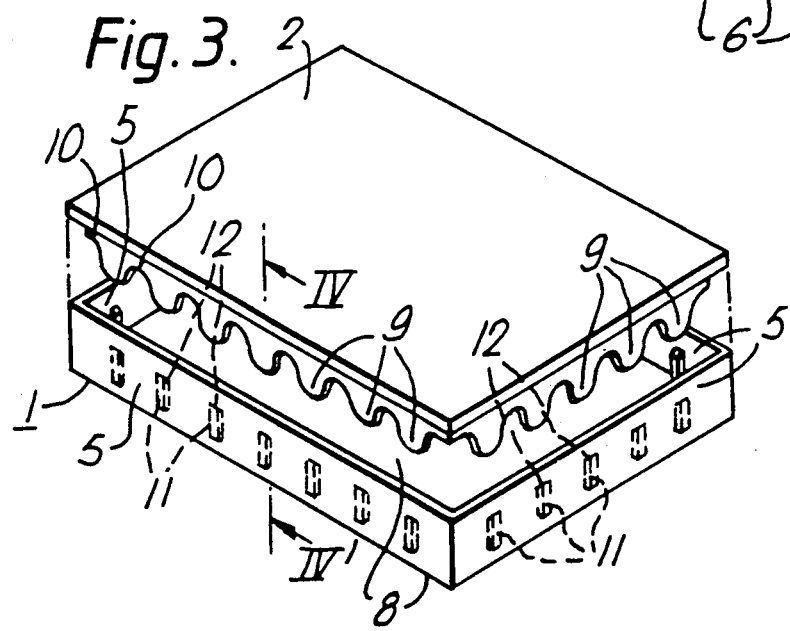
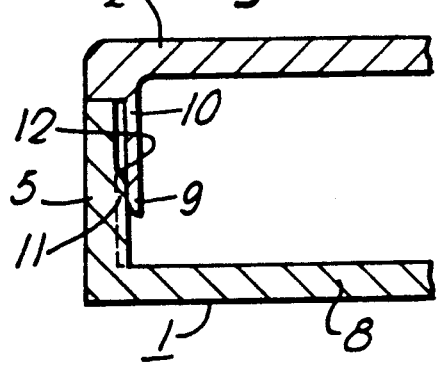
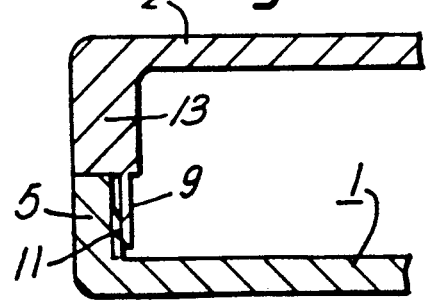

RF SEALED RADIO HOUSING

This invention relates to a housing for electronic circuitry and, more particularly, to a housing which prevents the escape of radio frequency (RF) radiation.

BACKGROUND OF THE INVENTION

It is well known that radiation generated by circuitry operating at high frequencies can cause interference with radio and television broadcasts, a phenomenon which is called radio frequency interference (RFI). To prevent RFI the circuitry may be enclosed in an electrically conductive housing. For example, in a mobile radio telephone the circuitry of the transceiver is commonly contained within a conductive housing comprising an open-topped box and a separate lid for closing the box. To prevent RF radiation escaping from the housing it is important for there to be an effective and continuous RFI seal between the lid and the box.

FIG. 1 shows in cross-section a part of a prior art transceiver housing comprising an open-topped box 1 and a lid 2. The sealing means comprises a compressible conductive 0-ring gasket 3 made, for example, of a metal braid with a sponge rubber core. The gasket 3 is seated in a channel 4 located in the top face of side wall 5 of the box 1. In use, the lid 2 is fastened down to the box 1, e.g. using screws, thus compressing the gasket 3 and forming continuous electrical contact (and hence an effective RF seal) between the lid and the box.

This prior art transceiver housing does, however, have drawbacks. Firstly, the side wall of the box has to be sufficiently wide to accommodate the sealing gasket 3. Consequently the side wall has to be made thicker than would otherwise be necessary. This necessitates the use of more material for manufacturing the box, which therefore increases the cost, and also results in the box occupying more space. Secondly, the gasket adds further to the expense of the overall housing and, being a separate component, requires an additional step in the assembly of the housing.

Another prior art transceiver housing employing a different RFI sealing means is illustrated in FIG. 2. In this case a series of electrically conductive leaf spring contacts 6 attached to the lid 2, e.g., by rivets 7, bear against the internal face of the side walls 5 of the box 1 (see FIG. 2A). The leaf springs 6 are suitably formed as a unitary comb-like member as shown in plan view in FIG. 2B. In the case of a rectangular housing four such comb-like members 8 would be used, one along each of the four sides of the lid 2. This housing arrangement has the advantage that it occupies less space, since the side walls of the box can be made thinner, but manufacture is more costly because of the extra material for the springs and assembly is more difficult and time consuming because of the requirement to attach the individual comb-like members 8 to the lid 2.

WO 83/01174 discloses as prior art a two-part housing for radio frequency circuitry comprising an open-topped box made of, for example cast aluminium and a cover plate made of a resilient material such as cold rolled steel. The cover plate includes integral rectangular-shaped flange projections bent at approximately 90° with respect to the plane of the cover plate. The flange projections are shaped with an elbow or ridge which makes electrical contact against the inside walls of the box when the cover plate is press fitted into the opening in the box, thus providing effective RFI sealing. This arrangement relies on the resilience of the flange projections.

SUMMARY OF THE INVENTION

According to the present invention there is provided a housing for radio circuitry, comprising an open-topped box having bottom and side walls made of electrically conductive material, and a separate electrically conductive lid for closing the box, wherein a plurality of projections depend from the lid and are integral therewith, the width of said projections gradually decreasing away from the lid, which projections are arranged to bear internally against the side walls of the box to prevent radio frequency radiation escaping from the housing.

In accordance with the invention the RFI sealing means are provided as projections integral with the lid of the housing. Assembly of the housing is therefore simplified, since the housing comprises only two components, namely the box and the lid, and so there is no separate sealing means to be fitted. Also the housing occupies minimum space since the side walls of the box can be made much thinner than the prior art housing described above with reference to FIG. 1. Furthermore, both the box and the lid of a housing in accordance with the invention can suitably be manufactured by diecasting.

Preferably, the projections are substantially flat in the plane of the side wall against which they bear. Also the width of the projections gradually decreases away from the lid. This arrangement, is particularly advantageous since it helps to achieve a better distribution of the stress on the mating parts, specifically the projections. As a result of this stress distribution it is possible to have the lid made of an inherently rigid material, specifically a diecast metal, such as aluminium. This is remarkable because diecast metals are notoriously brittle and, on the face of it, are therefore not suitable for forming spring features. However, the applicants have found that this particular configuration of flat, tapering, tongue-like projections is eminently compatible with diecasting since they have been found in practice not to break or otherwise become damaged during use although appreciable spring force may be exerted on them when the lid is in place on the box. Consequently, such diecast projection features are capable of providing an effective and continuous RFI seal between the lid and the box of the housing.

It is noted here that the tapering projections may have various outlines, either curvilinear or rectilinear, or a combination of the two. By way of example, the projections may have a substantially sinusoidal outline or a triangular ("saw-tooth") outline and in either case the peak of the projection may be truncated to leave a flat feature.

For optimum sealing it is preferable for neighbouring projections to be in adjoining relationship and to extend around substantially the whole periphery of the lid. The projections may, however, extend from a common ridge integral with the lid.

Suitably the projections depend substantially orthogonally to the lid. In a preferred embodiment a plurality of ribs is present on the internal side wall of the box, these ribs being arranged to engage and deflect a respective projection on the lid. This positive engagement ensures optimum RFI sealing and the preferred tapering profile for the projections enables them to suffer the stress of this deflection without breaking or damage even when they are formed by diecasting. Each of the ribs may be provided with a chamfered portion at the end facing the open top of the box. This chamfered portion acts as a guide feature, being arranged to engage the leading edge of the associated projection when the lid is placed on the box.

BRIEF DESCRIPTION OF THE DRAWINGS

Embodiments of the invention will now be described, by way of example, with reference to the accompanying drawing, in which:

FIG. 1 is a cross-section of part of a prior art transceiver housing,

FIG. 2A is a cross-section of part of a different prior art transceiver housing, FIG. 2B is a plan view of part of the sealing means of the housing in FIG. 2A, FIG. 3 is a perspective view of a transceiver housing in accordance with the invention, FIG. 4 is a cross-section of part of the housing taken on the line IV—IV' in FIG. 3, and FIG. 5 is a cross-section of an alternative transceiver housing in accordance with the invention.

In the various Figures the same reference numerals are used to designate like parts.

The housing shown in FIG. 3 is intended for containing the transceiver circuitry of a mobile radio telephone, and comprises a generally rectangular box 1 and a lid 2, both of which may be made of cast aluminium. The box 1 comprises a bottom 8 and side walls 5.

A plurality of adjoining tag-like projections 9 depend from the underside of the lid 2. The projections extend from an integral ridge 10, the ridge itself being formed integrally with the lid 2. The projections 9 are substantially flat and their width gradually decreases away from the lid. In the present embodiment the projections have a generally sinusoidal outline, giving a scalloped appearance. In a modified arrangement the curved peak of each projection 9 may be truncated to form a plateau feature. In a specific embodiment the overall dimensions of the box 1 were 25 mm in height, 155 mm in width and 155 mm in depth. The lid 2 was therefore 155 mm square. The thickness of the bottom and side walls of the box 1, and the lid 2, was 2.5 mm and the thickness of the projections 9 was 1.0 mm. The height of the ridge 10 was 2 mm and the overall length of the projections 9, i.e. peak to trough was 10 mm. The pitch of the projections was 15 mm.

The ridge 10 and depending projections 9 extend around the whole periphery of the lid 2, slightly inset from the edge of the lid so that the projections 9 extend inside the box 1 when the lid is placed on the box 1, as shown most clearly in FIG. 4.

A plurality of ribs 11 is present integrally on the internal face of the side walls 5 of box 1. Each rib 11, which is approximately 18 mm long, extends from the bottom of the box and has a chamfered portion 12 adjacent the open top of the box. The ribs 11 are arranged to engage a respective projection 9 when the lid 2 is placed on the box. Thus when the lid is being fitted on the box the chamfered portion 12 of the rib 11 engages the leading edge of the associated projection 9 which deflects and guides the projection 9 onto the main part of the rib 11. Thus, when the lid is in place, the projections 9 exert a spring force on the ribs 11 to provide a continuous and effective RFI seal between the lid and the box. As noted earlier, despite being brittle, the cast aluminium projections 9 are nevertheless capable of suffering the slight deflection which they experience here due to their tapering profile which distributes the stress efficaciously as discussed previously.

In FIG. 5 there is shown a different version of a transceiver housing in accordance with the invention, in which the lid 2 has side walls 13 from which the integral projections 9 depend. As shown, the side walls 13 of the lid 2 are deeper than the side walls 5 of the box 1, but they may instead be substantially equal or smaller.

It will be understood that the box and lid configurations described herein may be inverted so that the so-called "lid" effectively becomes the base of the housing and the "open-topped box" is therefore disposed on top of the lid.

In view of the foregoing description it will be evident to a person skilled in the art that various modifications may be made within the scope of the present invention. For example, as noted above, the outline of the projections need not be sinusoidal but may have a different curved form, or may be rectilinear, or a combination of the two. Also, the housing need not be square or rectangular but may, for example, be circular. Furthermore, the ribs on the internal face of the side walls of the box may be dispensed with, but in this case it is preferable for the projections 9 on the lid to be inclined at more or less than 90° to provide intimate contact—and hence effective RFI sealing—between the lid and the box. Finally, it is noted that the invention is not restricted to a transceiver housing, nor indeed to radiotelephony applications, but may be used for housing any circuitry where there is a risk of generating radio frequency interference.

I claim:

1. A housing for electronic circuitry, comprising an open-topped box having bottom and side walls made of electrically conductive material, and a separate electrically conductive lid for closing the box, wherein a plurality of projections depend from the lid and are integral therewith, the width of said projections gradually decreasing away from the lid, which projections are arranged to bear internally against the side walls of the box to prevent radio frequency radiation escaping from the housing.

2. A housing for electronic circuitry as claimed in claim 1 wherein the projections are substantially flat in the plane of the side wall against which they bear.

3. A housing for electronic circuitry as claimed in claim 2 wherein the lid and the box are made of the same material.

4. A housing for electronic circuitry as claimed in claim 3, wherein the lid is manufactured by diecasting.

5. A housing for electronic circuitry as claimed in claim 4, wherein the lid comprises aluminium.

6. A housing for electronic circuitry as claimed in claim 1, wherein the projections extend from a common ridge integral with the lid.

7. A housing for electronic circuitry as claimed in claim 1, wherein the projections depend substantially orthogonally to the lid.

8. A housing for electronic circuitry as claimed in claim 1, wherein neighbouring projections are in adjoining relationship.

9. A housing for electronic circuitry as claimed in claim 1, wherein the projections extend around substantially the whole periphery of the lid.

10. A housing for electronic circuitry as claimed in claim 1, wherein the projections are arranged in a generally tooth-like configuration.

11. A housing for electronic circuitry as claimed in claim 1, wherein the side wall of the box comprises a plurality of ribs on the internal face thereof, which ribs are arranged to engage and deflect a respective projection on the lid.

12. A housing for electronic circuitry as claimed in claim 11 wherein each rib is provided with a chamfered portion at the end facing the open top of the box, which chamfered portion is arranged to engage the leading edge of the associated projection when the lid is placed on the box.

13. A housing for electronic circuitry, comprising an open-topped box having bottom and side walls made of electrically conductive material, and a separate electrically conductive lid for closing the box, wherein a plurality of projections depend substantially orthorgonally to the lid, the width of said projections gradually decreasing away from the lid, which projections are arranged to bear internally against the side walls of the box to prevent radio frequency radiation escaping from the housing, said projections being substantially flat in the plane of the side wall against which they bear.

14. A housing for electronic circuitry as claimed in claim 13, wherein neighbouring projections are in adjoining relationships.

15. A housing for electronic circuitry as claimed in claim 14, wherein the projections extend around substantially the whole periphery of the lid.

16. A housing as claimed in claim 15, wherein the projections are arranged in a generally tooth-like configuration.

17. A housing as claimed in claim 16, wherein the projections extend from a common ridge integral with the lid.

18. A housing for electronic circuitry as claimed in claim 13, wherein the side wall of the box comprises a plurality of ribs on the internal face thereof, which ribs are arranged to engage and deflect a respective projection on the lid.

19. A housing for electronic circuitry as claimed in claim 18 wherein each rib is provided with a chamfered portion at the end facing the open top of the box, which chamfered portion is arranged to engage the leading edge of the associated projection when the lid is placed on the box.

* * * * *

/

REEXAMINATION CERTIFICATE (2361st)

United States Patent [19]

Johnson

[11] B1 5,095,177

[45] Certificate Issued Aug. 23, 1994

[54] RF SEALED RADIO HOUSING

[75] Inventor: Martin L. Johnson, Yately, England

[73] Assignee: Nokia Mobile Phones (U.K.) Limited, Camberley, United Kingdom

Reexamination Request:
No. 90/003,081, Jun. 3, 1993

Reexamination Certificate for:
Patent No.: 5,095,177
Issued: Mar. 10, 1992
Appl. No.: 585,882
Filed: Sep. 20, 1990

[51] Int. Cl.$^5$ .................................. H05K 9/00
[52] U.S. Cl. ..................... 174/35 R; 174/35 MS; 361/818
[58] Field of Search .......... 174/35 R, 35 GC, 35 MS; 361/816–818; 219/10.55 D, 10.55 R; 220/3.8, 4.02, 4.28, 608–609, 623–624, 669–670, 681; 455/300–301; 439/607–610

[56] References Cited

U.S. PATENT DOCUMENTS

| | | |
|---|---|---|
| 1,765,443 | 6/1930 | Peterson . |
| 2,627,359 | 2/1953 | Woodward ......................... 220/3.5 |
| 3,534,146 | 10/1970 | Fell ..................................... 174/35 |
| 3,909,726 | 9/1975 | Dobrovolny et al. ............... 325/357 |
| 3,960,436 | 6/1976 | Minks et al. ........................ 439/751 |
| 4,759,466 | 7/1988 | Chase et al. ........................ 220/306 |
| 4,816,612 | 3/1989 | Yeom .................................. 174/35 R |

FOREIGN PATENT DOCUMENTS

| | | |
|---|---|---|
| 0219639A2 | 8/1986 | European Pat. Off. . |
| 0298797 | 12/1989 | Japan . |
| 83/01174 | 3/1983 | World Int. Prop. O. . |

OTHER PUBLICATIONS

"Internally Modular Signal Generator Mechanical Design" by Jewell et al., Hewlett–Packard Journal, vol. 36, No. 12, Dec. 1985, pp. 14–18.

*Primary Examiner*—Leo P. Picard

[57] ABSTRACT

A two-piece transceiver housing for a mobile telephone comprises an open-topped box and a separate lid both made of conductive material, specifically diecast aluminium. A plurality of flat projections are formed integrally on the underside of the lid. These projections are arranged to bear internally against the side wall of the box when the lid is in place to prevent radio frequency radiation escaping from the housing without the need for a separate sealing component. The projections have a tapering curvilinear or rectilinear profile. This helps to distribute the stress and enables the projections to suffer slight deflection without breaking even when they are made of cast aluminium which is relatively brittle.

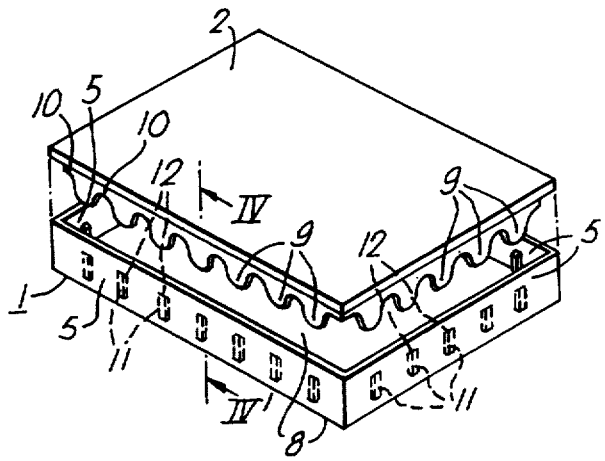

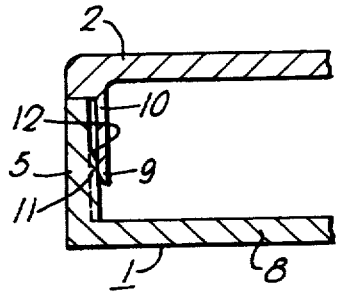

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 13 are determined to be patentable as amended.

Claims 2-12 and 14-19, dependent on an amended claim, are determined to be patentable.

New claim 20 is added and determined to be patentable.

1. A housing for electronic circuitry, comprising an open-topped box having bottom and side walls made of electrically conductive material, and a separate electrically conductive lid for closing the box, wherein a plurality of projections depend from the lid and are integral therewith, the width of said projections gradually decreasing away from the lid, which projections are arranged to *inwardly deflect when the lid is connected to the box to thereby* bear internally against the side walls of the box to prevent radio frequency radiation escaping from the housing.

13. A housing for electronic circuitry, comprising an open-topped box having bottom and side walls made of electrically conductive material, and a separate electrically conductive lid for closing the box, wherein *the lid is a one-piece member with* a plurality of *integral* projections [depend] *depending* substantially orthogonally to the lid, the width of said projections gradually decreasing away from the lid, which projections are arranged to *be inwardly deflected by the box when the lid is connected to the box to thereby* bear internally against the side walls of the box to prevent radio frequency radiation escaping from the housing, said projections being substantially flat in the plane of the side wall against which they bear.

*20. A housing for electronic circuitry, comprising an open-topped box having bottom and side walls made of electrically conductive material, and a separate electrically conductive lid for closing the box, wherein the lid is comprised of single rigid member made exclusively of electrically conductive material having a plurality of projections that depend from the lid and are integral therewith, the width of said projections gradually decreasing away from the lid, which projections are arranged to bear internally against the side walls of the box to prevent radio frequency radiation escaping from the housing.*

* * * * *